April 14, 1970 E. CORENZWIT ET AL 3,506,940

HIGH TRANSITION TEMPERATURE SUPERCONDUCTOR AND DEVICES UTILIZING SAME

Filed May 2, 1967

INVENTORS: E. CORENZWIT
T. H. GEBALLE
L. D. LONGINOTTI
B. T. MATTHIAS

BY George S. Indig
ATTORNEY

United States Patent Office 3,506,940

Patented Apr. 14, 1970

3,506,940

HIGH TRANSITION TEMPERATURE SUPERCONDUCTOR AND DEVICES UTILIZING SAME

Ernest Corenzwit, New Providence, Theodore H. Geballe, Summit, Louis D. Longinotti, South Plainfield, and Bernd T. Matthias, Summit, N.J., assignors to Bell Telephone Laboratories, Incorporated, Murray Hill, N.J., a corporation of New York Filed May 2, 1967, Ser. No. 635,471

Int. Cl. C21d *1/26*; H01f *11/04, 7/22*

U.S. Cl. 335—216 5 Claims

ABSTRACT OF THE DISCLOSURE

Superconducting materials in the $Nb_3Al$–$Nb_3Ge$ system having increased transition temperatures are produced by a series of processing steps including a critical anneal schedule. Exemplary materials within the system evidence transition temperatures of 19.5° K. and above.

BACKGROUND OF THE INVENTION

(1) Field of the invention

The invention is concerned with high transition temperature superconducting materials. Increased transition temperature inherently permits superconducting operation at higher temperature and also in general permits generation of or exposure to higher magnetic fields. Superconductors of the invention are of potential technological interest for use in switches and memory elements, magnet structures and for use in lieu of simple conductors.

(2) Description of the prior art

The discovery of $Nb_3Sn$ was announced in 1954 (Physical Review, vol. 95, page 1435). The ensuing years have seen a resurgence of interest in superconductivity and thousands of articles have appeared in the technical literature reporting transition temperatures and other characteristics for countless new superconducting materials.

This intense activity has resulted in the evolution of theories and also in new compositions and structures, all of which have advanced the art. While increased understanding and improvement in certain characteristics has resulted, little improvement has been seen in the value of $T_c$, that is, the highest temperature at which a material shows superconducting properties.

Based partly on theory and partly on practice, it has been proposed that the beta-wolfram phases of the materials $Nb_3Ge$ and $Nb_3Al$ should evidence useful values of $T_c$ as well as other suitable device properties. In consequence, there has been experimental work reported on both of these compounds as well as on mixed systems of various compositions. See, for example, Izvestiya Anssr, Neorgan Materialy, 2(12) pp. 2156–61 (1966). Reported results have to date been quite disappointing, with all compositions within the system showing transition temperatures lower than anticipated.

It is of considerable interest to note that the thirteen-year old material $Nb_3Sn$ evidences a transition temperature variously reported over the range of from 18° K. to 18.5° K., which while equalled in a very small number of materials, has never been exceeded. In fact, studies conducted on literally thousands of superconducting compositions have not resulted in so much as an increase of one-tenth of one degree. The "18° limit" has become so firmly associated with superconductivity that many workers have attempted to find theoretical basis.

SUMMARY OF THE INVENTION

Superconducting compositions including the end members of the system $Nb_3Al$–$Nb_3Ge$ having increased values of $T_c$ are produced in accordance with a critical annealing schedule. Such annealing invariably results in improvement of the transition temperature, regardless of the manner in which the composition is initially prepared. In fact, the problem of approaching or attaining the designated stoichiometry of three niobium atoms to each aluminum and/or germanium atom is considered generally outside the scope of this description. It is known that certain preparatory techniques are preferred for the end members. See, for example, 139 Phys. Rev. A1501 (1965) and 9 J. Phys. Chem. Solids 93 (1959). Illustrative suitable preparatory techniques are described herein, but primarily to assist the worker seeking to reproduce the reported results.

The annealing schedule is extremely critical over the entire system. It requires exposure over a temperature range of from 650° C. to 1000° C. for a period of from ten hours to five minutes, with the shorter time corresponding with the higher temperature. Intermediate times are linearly related to temperature. While the range is so simply set forth, the process is, in fact, an exceedingly complex one. The anneal conditions chosen are those which are suitable for preserving or establishing the desired stoichiometry while introducing atomic order.

Annealing of designated materials of a particular mixed compositional range results in attainment of the highest values of $T_c$ thus far reported for any material. A preferred embodiment is defined by such a compositional range which when processed in accordance with the annealing schedule results in a $T_c$ value of at least 18.7° K. This preferred compositional range may be expressed as from $[Nb_3Al]_{.95}[Nb_3Ge]_{.05}$ to $[Nb_3Al]_{.40}[Nb_3Ge]_{.60}$, with all subscript values representing ratios in the conventional manner. A still more preferred compositional range is defined as from $[Nb_3Al]_{.90}[Nb_3Ge]_{.10}$ to $[Nb_3Al]_{.67}[Nb_3Ge]_{.33}$, with resulting $T_c$ values for this range being at 19.5° K. and higher, of course using appropriate anneal conditions. Preferred anneal conditions which result in these exemplary $T_c$ values are within the range of 700 to 800° C.

Like $Nb_3Sn$, the metallic compounds $Nb_3Al$ and $Nb_3Ge$ are brittle. Fabrication of wire structures is not based on conventional wire-drawing techniques but may utilize the technology which has been developed in the fabrication of $Nb_3Sn$. Such techniques include the core process, in accordance with which starting powdered materials are packed into a tube which is drawn down together with contents to form the desired wire structure, after which reaction is brought about thermally (see 32 J. App. Phys. 325 (1961) by vapor deposition on a flexible substrate such as by the hydrogen reduction of hydrides of the initial elemental materials (see Metallurgy of Metallic of Metallic Materials, G. E. Brock, Editor, Interscience Pub. Co., N.Y. 1961, page 161), and by diffusion, for example, of plated or otherwise deposited aluminum and germanium into a niobium substrate.

DETAILED DESCRIPTION

(1) The drawing

Figure 1:
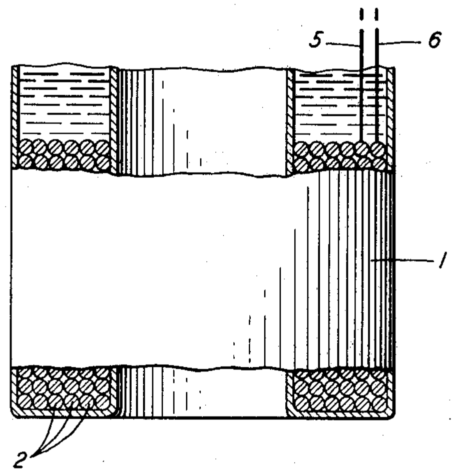
FIG. 1 is a sectional view of a magnetic configuration consisting of an annular cryostat containing a plurality of windings of a material of the $[NB_3Al][Nb_3Ge]$ system.

Referring more specifically to FIG. 1, there is shown an annular cryostat 1 of the approximate dimensions 18" O.D. x 6" I.D. x 30" long, filled with coolant and containing 2000 turns per centimeter length of windings 2. Terminal leads 5 and 6 are shown emerging from the coil. A pumping means, not shown, may be attached to the cryostat so as to permit a temperature variation, so resulting in a concomitant variation in boiling point of, for example, liquid helium for this pressure.

Variations in magnetic configurations using the inventive materials may be made in accordance with established practice. For example, successive layers of windings may be connected in parallel so as to permit individual turns to operate at field values more nearly approaching the characteristic value of $H_c$ for the material. Here, as with other superconducting configurations, it may be desirable to insulate successive windings by thin coatings of any of the ductile materials gold, silver, and copper which may be drawn down together with the initial inventive body (see Journal of Applied Physics, vol. 32, pages 325–6).

Figure 2:
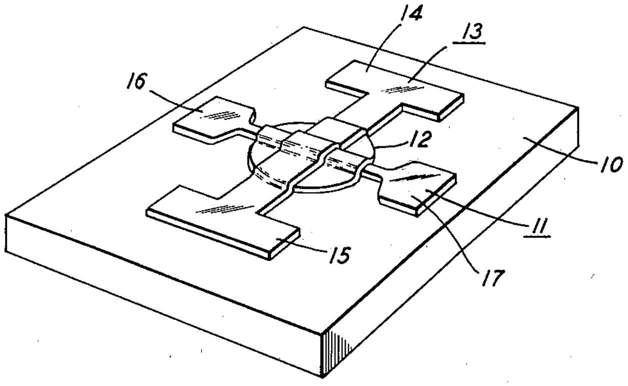
FIG. 2 is a perspective view of a simple cryotron memory element or switch using a material herein.

The device of FIG. 2 includes an insulating substrate 10 and a control film 11 constructed of a superconducting material having a given critical temperature overlying which there is an insulating layer 12 suitably constructed, for example, of silicon monoxide. Finally, overlying 12 and so electrically separated from layer 11, there is a second superconducting material 13, known as the gate and having a second critical temperature value somewhat lower than that of layer 11. As is well documented in the many literature references concerned with such devices, the gating layer 13 is caused to undergo change from the superconducting to the normal state in accordance with the amount of current caused to flow through control film 11. Circuitwise, the device is provided with electrode regions 14, 15, 16, and 17, for interconnecting it with suitable circuitry.

The device depicted is illustrative of a large class dependent for their operation upon change of at least a superconducting portion between a superconducting and a normal state. Such change may be undergone with regularity as part of the regular performance of the device or it may only be undergone in response to an unusual set of conditions. Materials of the present invention are considered to be preferred for such use since the increased transition permits higher temperature operation. For certain specified materials treated in accordance with the preferred conditions, such operation may be at higher temperature than has been permitted in the past.

(2) The process

It has been indicated that the critical step and, in fact, the operation upon which the invention is primarily premised, is annealing. It has been indicated that the broad annealing range is from 650° C. to 1000° C. While slight deviation is permitted outside this range, considerable experimentation has established a surprising criticality. For example, while treatment at 650° C. has produced substantially increased values of $T_c$, prolonged exposure at 600° C. has produced no such results. Annealing at temperatures substantially in excess of 1000° C. may not be harmful if carried out for periods of less than five minutes. However, exposure to temperatures of the order of 1100° C. or higher has actually produced a decrease in value in $T_c$. This effect is thought to inure from increased rather than decreased disorder. This premise is substantiated by the fact that high values of $T_c$ may be recovered and even enhanced by subsequent annealing within the inventive conditions.

Time of anneal is not as critical as temperature. Lesser times than those indicated do produce some increase in transition temperature, so that the values set forth should be considered to be preferred minimums. Increasing time is, of course, permitted and does generally result in some further improvement in transition temperature. For all temperatures there is, however, a maximum value of transition temperature which is approached with increasing time.

The preferred range of from 700 to 800° C. is premised on the experimental results, and it is annealing within this range which has thus far resulted in the highest transition temperatures.

Annealing should, in general, be carried out in an atmosphere which is inert with respect to the superconducting composition. Suitable atmosphere include vacuum, argon and helium. The effect of reactive constituents in the atmosphere on any of the concerned compositions is well understood. In general, oxygen, nitrogen, and certain other active components may be tolerated depending on times of exposure and on sample size. Bulk samples of the order of a quarter of an inch or more in their smallest dimension remain substantially unaffected through their cross section and may more easily tolerate reactive atmospheric components.

While there is some flexibility in the order of processing steps, it is apparent that annealing should not be followed by any procedure which has the effect of increasing disorder. Clearly, for example, critical annealing may not be followed by exposure of more than five minutes to temperature substantially in excess of 1000° C. Generally, there is no objection to cold working subsequent to annealing, although such working is oftentimes prevented by the brittle nature of the material itself. Nevertheless, certain wire structures, such as those produced by vapor codeposition on a flexible core are of such nature as to permit coil winding subsequent to fabrication and annealing.

It has been noted that the anneal procedure, though simply and precisely stated, is from a stoichiometric and order standpoint quite complex.

Nevertheless, to a certain extent, choice of temperature and time may be made on a kinetic basis. Even though asymptotic $T_c$ values may peak over the preferred temperature range of from 700 to 800° C., it may, from the standpoint of expediency, be desired to conduct at least part of the heat treatment over a higher temperature range. It has been determined, for example, that the asymptotic or saturation $T_c$ value resulting from 750° C. treatment may result from annealing continuously at such temperature or by heating at a somewhat higher temperature and finally reducing temperature to the 750° C. level. This, in turn, suggests a decreased rather than constant temperature schedule and such may be commercially expedient.

(3) Initial formation

It has been found that the critical temperature of any composition within the designated system is improved upon annealing, of course within the specified conditions. While this in invariably true, the specific properties developed depend on certain other factors such as the degree with which the specified stoichiometry is approached, either during initial formation or during annealing, and also the microcrystalline nature of the initial material. Referring, for example, to the latter, where there are two or more phases present, the critical temperature of the overall material is improved by annealing even though only a part of the body, perhaps as little as 10 percent by volume, is of the designated stoichiometry. Increasing the amount of the preferred phase may result in improvement of other superconducting properties as, for example current-carrying capacity. Under certain conditions, the presence of additional phases may have the effect of precipitation hardening and may actually result in improvement in current-carrying capacity. All such considerations are independent of the invention, which is directed primarily to improvement in $T_c$ of any beta-wolfram phase material present.

A considerable body of experimental work has resulted in the specification of procedures suitable for various of the compositions to which the invention is limited. Small samples of material may be prepared by procedures such as arc melting, levitation melting, and splat melting. Much of the experimental work reported herein was carried out on samples which were arc melted. The general procedure used is outlined.

The desired quantities of elemental materials are weighed out and melted in a button-welding inert arc furnace. The apparatus used consists of a water-cooled copper hearth with a ¾ inch diameter hemispherical cavity. The cavity, together with contents, acts as a first electrode. A second, nondisposable electrode, also water-cooled, made, for example, of tungsten, is spaced from the surface of the contents of the cavity (¼ inch was found suitable), an arc is struck using high-frequency current (0.5 megacycle or greater) and is maintained with a D.C. potential sufficient to bring about melting. For a 10-gram charge, a 40-volt potential at a spacing of ¼ inch resulted in a current of about 300 amperes, which is sufficient to bring about melting in a period of about 10 to 15 seconds. Since melting is prevented at the interface between the contents and water-cooled crucible, homogenization is brought about only by turning over the charge and repeating the procedure several times. Five or six repetitions were generally found adequate.

Splat melting has also been utilized. In splat melting starting materials are melted and the molten material is driven at high velocity tangentially against a cold metal surface where extremely rapid freezing occurs.

Levitation melting was used in Izvestiya Anssr, Neorgan Materialy 2 (12), pages 2156–61 (1966).

Limitations and other described considerations are based on a large body of experimental information from which the following representative examples have been selected. For convenience, examples are set forth in tabular form. They represent anneal conditions and compositions over the entire specified range.

coil containing a superconducting material evidences no such change insofar as flux is excluded by the superconductor. A non-zero galvanometer reading in a given direction is obtained when the sample placed within one of the secondaries is superconducting. The particular galvanometer used was such that it integrated over a period of approximately a second, an interval adequate to ensure complete pentration of any nonsuperconducting material contained within a secondary coil.

The second technique is based on the fact that there is a discontinuity in heat capacity at the transition temperature. Parallel measurements made using the flux exclusion and heat capacity measurements resulted in temperature determinations within ±0.05° K.

Clearly, from the technological standpoint, a significant motivation behind the work directed toward increasing transition temperature is the eventual replacement of the relatively inefficient helium coolant by some other refrigerant. Materials prepared in accordance with this invention have, in fact, been observed in their superconducting state in liquid hydrogen maintained at a pressure of 690 millimeters of mercury, and much of the transition temperature data presented has been verified by such observation.

The invention has been described in terms of a limited number of specific embodiments. To facilitate further development work, actual conditions utilized during procedures prior to or subsequent to annealing have been described. The inventive claims are not to be so limited.

What is claimed is:

1. Elongated superconducting body having a transition temperature of at least 18.5° K. forming a plurality of turns comprising a composition selected from the group consisting of $Nb_3Al$, $[Nb_3Ge]$ and solid solutions of $Nb_3Al$ with up to 60 mol percent $Nb_3Ge$, characterized in that the said body is annealed over the temperature range of from 650° C. to 1000° C. for a period of at least from ten hours to five minutes, with shorter times corresponding with higher temperatures.

| Ex. No. | Starting mat'l (grams) | | | Composition | Initial $T_c$ | Annealing conditions | | | | $T_c$ after anneal | | | |
|---|---|---|---|---|---|---|---|---|---|---|---|---|---|
| | Nb | Al | Ge | | | 1st | 2nd | 3rd | 4th | 1st | 2nd | 3rd | 4th |
| 1 | 1.095 | 0.114 | 0 | $Nb_3Al$ | 17.3 | 800°/700° | | | | 18.5 | | | |
| 2 | 1.257 | 0.128 | 0.013 | $[Nb_3Al]_{.96}[Nb_3Ge]_{.04}$ | | 800°/63 hr | | | | 18.6 | | | |
| 3 | 1.088 | 0.102 | 0.034 | $[Nb_3Al]_{.88}[Nb_3Ge]_{.12}$ | 18.1 | 800°/700° | | | | 19.6 | | | |
| 4 | 0.250 | 0.215 | 0.013 | $[Nb_3Al]_{.80}[Nb_3Ge]_{.20}$ | 18.3 | 900°/2 day | 800°/2 day | 800°/1 day | 800°/700° | 19.0 | 19.9 | 19.9 | 20.0 |
| 5 | 1.478 | 0.125 | 0.077 | $[Nb_3Al]_{.80}[Nb_3Ge]_{.20}$ | 18.3 | 800°/700° | | | | 20.0 | | | |
| | | | | | 18.3 | 650/19 hr | 650/11½ hr | | | 18.6 | 19.0 | | |
| 6 | 1.478 | 0.125 | 0.077 | $[Nb_3Al]_{.80}[Nb_3Ge]_{.20}$ | 18.3 | 700°/15 hr | 700°/36 hr | | | 19.2 | 19.5 | | |
| 7 | 1.478 | 0.125 | 0.077 | $[Nb_3Al]_{.80}[Nb_3Ge]_{.20}$ | 18.3 | 1,000°/½ hr | | | | 19.2 | | | |
| 8 | 1.478 | 0.125 | 0.077 | $[Nb_3Al]_{.80}[Nb_3Ge]_{.20}$ | 18.3 | 750°/15 hr | 750°/36 hr | | | 19.9 | 20.1 | | |
| 9 | 0.254 | 0.024 | 0.015 | $[Nb_3Al]_{.78}[Nb_3Ge]_{.22}$ | | 800°/700° | | | | 19.7 | | | |
| 10 | 1.186 | 0.099 | 0.077 | $[Nb_3Al]_{.75}[Nb_3Ge]_{.25}$ | 18.3 | 800°/700° | | | | 20.0 | | | |
| 11 | 1.134 | 0.083 | 0.095 | $[Nb_3Al]_{.68}[Nb_3Ge]_{.32}$ | | 800°/63 hr | | | | 19.9 | | | |
| 12 | 1.315 | 0.087 | 0.137 | $[Nb_3Al]_{.60}[Nb_3Ge]_{.40}$ | | 800°/2½ day | | | | 19.6 | | | |
| 13 | 1.305 | 0.073 | 0.170 | $[Nb_3Al]_{.50}[Nb_3Ge]_{.50}$ | 17.4 | 800°/2½ day | | | | 19.0 | | | |

800/700 entries mean sample was slowly cooled from 800° K. to 700° K. over a period of 63 hrs.

Critical temperature values reported in the examples were determined by either or both of two techniques. In accordance with the first of these, $T_c$ values were determined by the standard flux exclusion method utilizing measurements made with a ballistic galvanometer across a pair of secondary coils electrically connected in series opposition, both contained within primary coils. In accordance with this method, the sample is placed within one of the coils and the primary is pulsed with a make-break circuit, for example at 6 volts and 10 milliamperes. An individual secondary coil with an air core or containing any nonsuperconducting material evidences a varying induced voltage with time due to penetration of flux. A 2. Body of claim 1 together with first means for maintaining temperature below the superconducting transition temperature of the said composition and second means for initiating electric current flow through said body.

3. Process for increasing the superconducting transition temperature of a composition selected from the group consisting of $Nb_3Al$, $[Nb_3Ge]$ and solid solutions of $Nb_3Al$ with up to 60 mol percent $Nb_3Ge$ comprising annealing said composition within the temperature range of from 650° C. to 1000° C. for a period of from ten hours to five minutes, with the shorter times corresponding with the higher temperatures.

4. Process of claim 3 in which annealing is carried out over the temperature range of from 700° C. to 800° C.

5. Process of claim 3 in which said composition is within the range of from $[Nb_3Al]_{.90}[Nb_3Ge]_{.10}$ to $[Nb_3Al]_{.67}[Nb_3Ge]_{.33}$.

References Cited

UNITED STATES PATENTS 3,215,569 11/1965 Kneip et al. ---------- 148—133

OTHER REFERENCES

Science, May 1967, pp. 645–646.

Metallurgy of Advanced Electronic Materials, AIMME, Metallurgy Society Conferences, vol. 19, 1962, page 83.

CHARLES N. LOVELL, Primary Examiner

U.S. Cl. X.R.

75—134; 148—32, 133